(12) United States Patent
Triplett

(10) Patent No.: US 10,586,286 B2
(45) Date of Patent: *Mar. 10, 2020

(54) REPOSITIONING A VALUE AXIS

(71) Applicant: Trading Technologies International, Inc., Chicago, IL (US)

(72) Inventor: Mark W. Triplett, St Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,978

(22) Filed: Jul. 18, 2018

(65) Prior Publication Data
US 2018/0322582 A1 Nov. 8, 2018

Related U.S. Application Data

(63) Continuation of application No. 15/803,475, filed on Nov. 3, 2017, now Pat. No. 10,068,293, which is a
(Continued)

(51) Int. Cl.
G06Q 40/04 (2012.01)
G06Q 40/06 (2012.01)
G06F 17/24 (2006.01)

(52) U.S. Cl.
CPC ........... G06Q 40/06 (2013.01); G06F 17/246 (2013.01)

(58) Field of Classification Search
CPC combination set(s) only.
See application file for complete search history.

(56) References Cited

U.S. PATENT DOCUMENTS 3,731,387 A 5/1973 Slemmons
5,101,353 A 3/1992 Lupien et al.
(Continued)

FOREIGN PATENT DOCUMENTS

JP 2005-523506 A 8/2005
JP 2008-508617 A 3/2008
(Continued)

OTHER PUBLICATIONS

Kumar, M. Winograd, T., Paepcke, A. Gaze-enhanced scrolling techniques. Published in: Proceeding CHI EA '07 CHI '07 Extended Abstracts on Human Factors in Computing Systems pp. 2531-2536 ; San Jose, CA, USA—Apr. 28-May 3, 2007.*
(Continued)

*Primary Examiner* — Asha Puttaiah
(74) *Attorney, Agent, or Firm* — McDonnell Boehnen Hulbert & Berghoff LLP

(57) ABSTRACT

Various embodiments of a trading screen allow a market value indicator to go out of view without necessarily triggering a command to reposition a value axis. The value axis may be repositioned to bring the market value indicator back in view when the market value indicator satisfies a threshold condition. The threshold condition is defined such that it is possible for the market value indicator to go out of view and not trigger a command to reposition the value axis. Various embodiments automatically reposition the value axis in a way that can provide the user with more overall control of the trading screen than previous trading screens. Further, the user may gain increased confidence in using the trading display, particularly with respect to single action order entry, because there is less risk of the value changing on the display during order entry. These advantages and others will be evident to a person of ordinary skill in the art of the embodiments described herein.

9 Claims, 6 Drawing Sheets

Related U.S. Application Data continuation of application No. 12/913,353, filed on Oct. 27, 2010, now Pat. No. 9,858,620.

(56) References Cited

U.S. PATENT DOCUMENTS

| | | | |
|---|---|---|---|
| 5,270,922 | A | 12/1993 | Higgins |
| 6,278,982 | B1 | 8/2001 | Korhammer et al. |
| 6,654,036 | B1 | 11/2003 | Jones |
| 6,772,132 | B1 | 8/2004 | Kemp, II et al. |
| 7,379,909 | B1 | 5/2008 | Cruz et al. |
| 7,461,023 | B1 | 12/2008 | Helweg |
| 7,587,357 | B1 | 9/2009 | Buck |
| 7,613,651 | B1 | 11/2009 | Buck |
| 7,685,055 | B2 | 3/2010 | Brumfield et al. |
| 7,689,499 | B1 * | 3/2010 | Duquette ............ G06Q 30/0601 705/37 |
| 7,761,362 | B2 | 7/2010 | Triplett |
| 7,930,240 | B1 | 4/2011 | Buck |
| 9,858,620 | B2 | 1/2018 | Triplett |
| 10,068,292 | B2 * | 9/2018 | Sandow ................ G06Q 40/04 |
| 2002/0055899 | A1 | 5/2002 | Williams |
| 2002/0073017 | A1 | 6/2002 | Robertson |
| 2003/0004853 | A1 | 1/2003 | Ram et al. |
| 2003/0009411 | A1 | 1/2003 | Ram et al. |
| 2003/0208424 | A1 | 11/2003 | Tenorio |
| 2004/0117292 | A1 | 6/2004 | Brumfield et al. |
| 2005/0192887 | A1 * | 9/2005 | Triplett ................. G06Q 30/02 705/37 |
| 2006/0259384 | A1 | 11/2006 | Schluetter et al. |
| 2007/0156565 | A1 | 7/2007 | Singer et al. |
| 2007/0240053 | A1 | 10/2007 | Lutnick et al. |
| 2007/0244783 | A1 | 10/2007 | Wright et al. |
| 2009/0171832 | A1 | 7/2009 | Busby |
| 2010/0030678 | A9 | 2/2010 | Stearns |
| 2010/0100504 | A1 | 4/2010 | Highland et al. |
| 2010/0131387 | A1 | 5/2010 | Duquette |
| 2012/0109845 | A1 | 5/2012 | Triplett |
| 2018/0060967 | A1 | 3/2018 | Triplett |
| 2018/0060968 | A1 | 3/2018 | Triplett |

FOREIGN PATENT DOCUMENTS

| | | |
|---|---|---|
| WO | 2003/090032 A2 | 10/2003 |
| WO | 2006/015336 | 2/2006 |

OTHER PUBLICATIONS

"19.2 Automatic Scrolling" https://web.archive.org/web/20080507022720/http://www.gnu.org/software/emacs/manual/html_node/emacs/Auto-Scrolling.html.

Hungarian Intellectual Property Office Search Report and Written Opinion in Singapore Application No. 201303256-0 dated Mar. 27, 2014, dated Jul. 8, 2014.

International Search Report and Written Opinion dated Jan. 19, 2012 for PCT Patent Application No. PCT/US11/57902.

\* cited by examiner

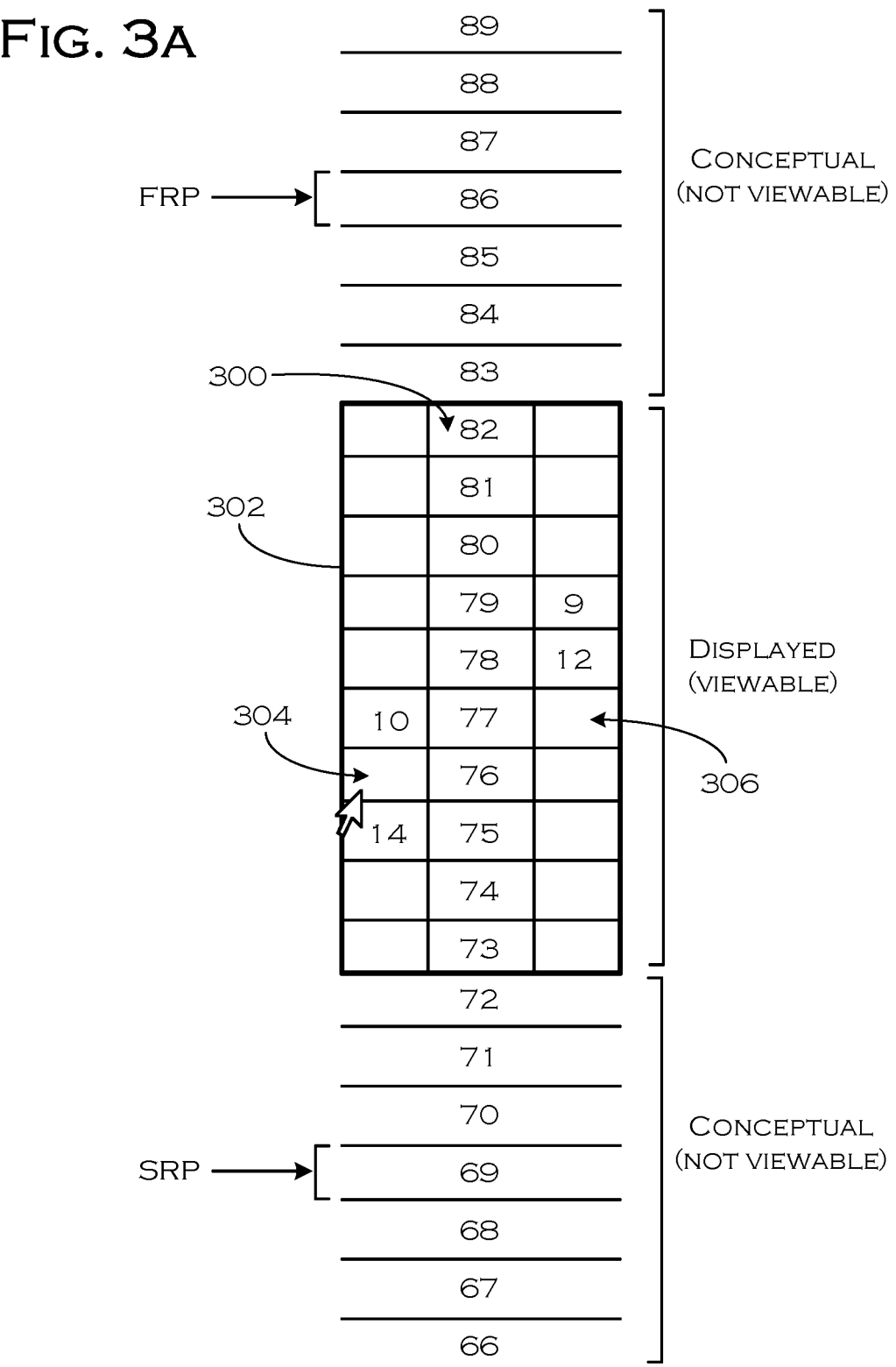

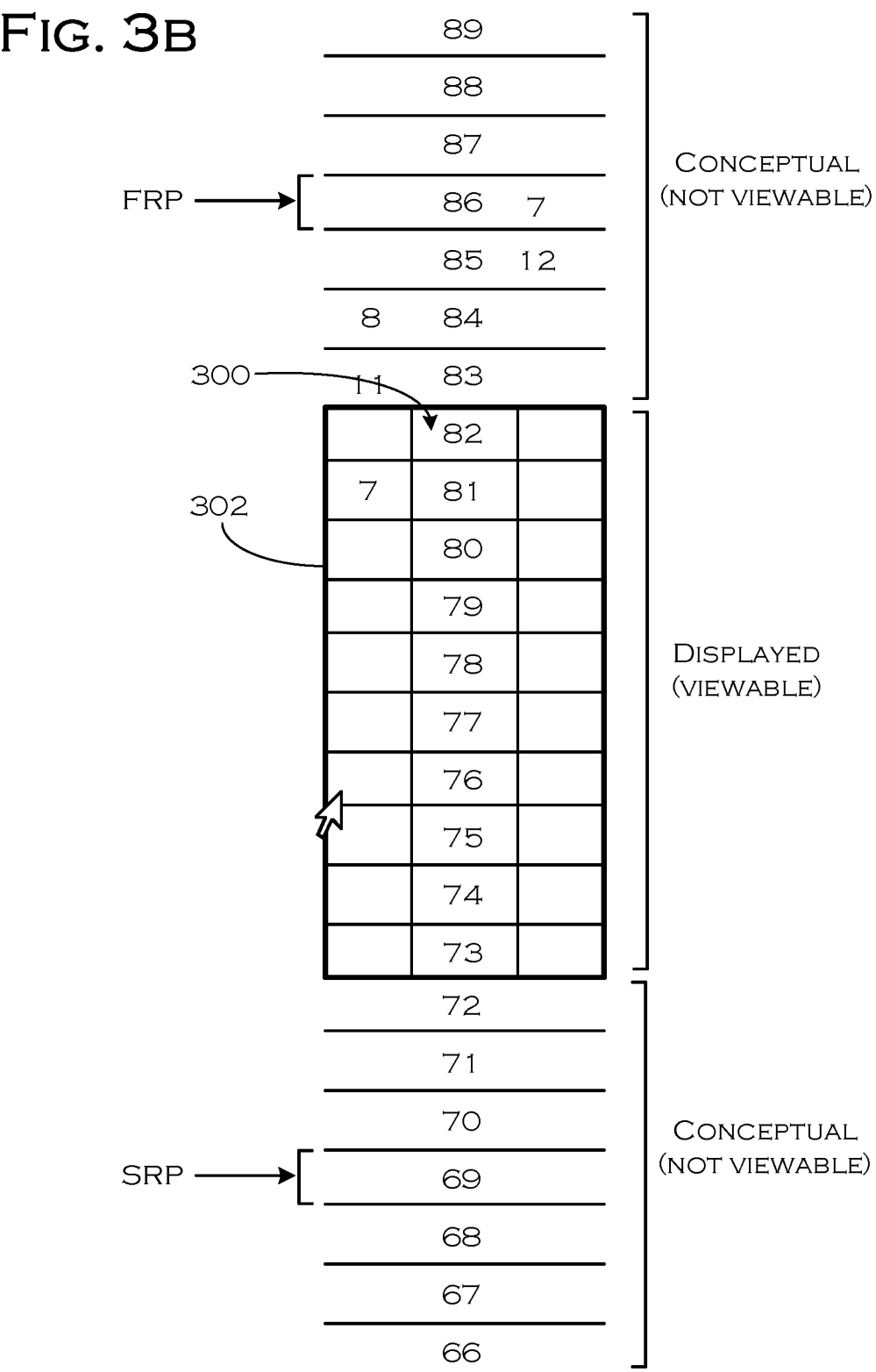

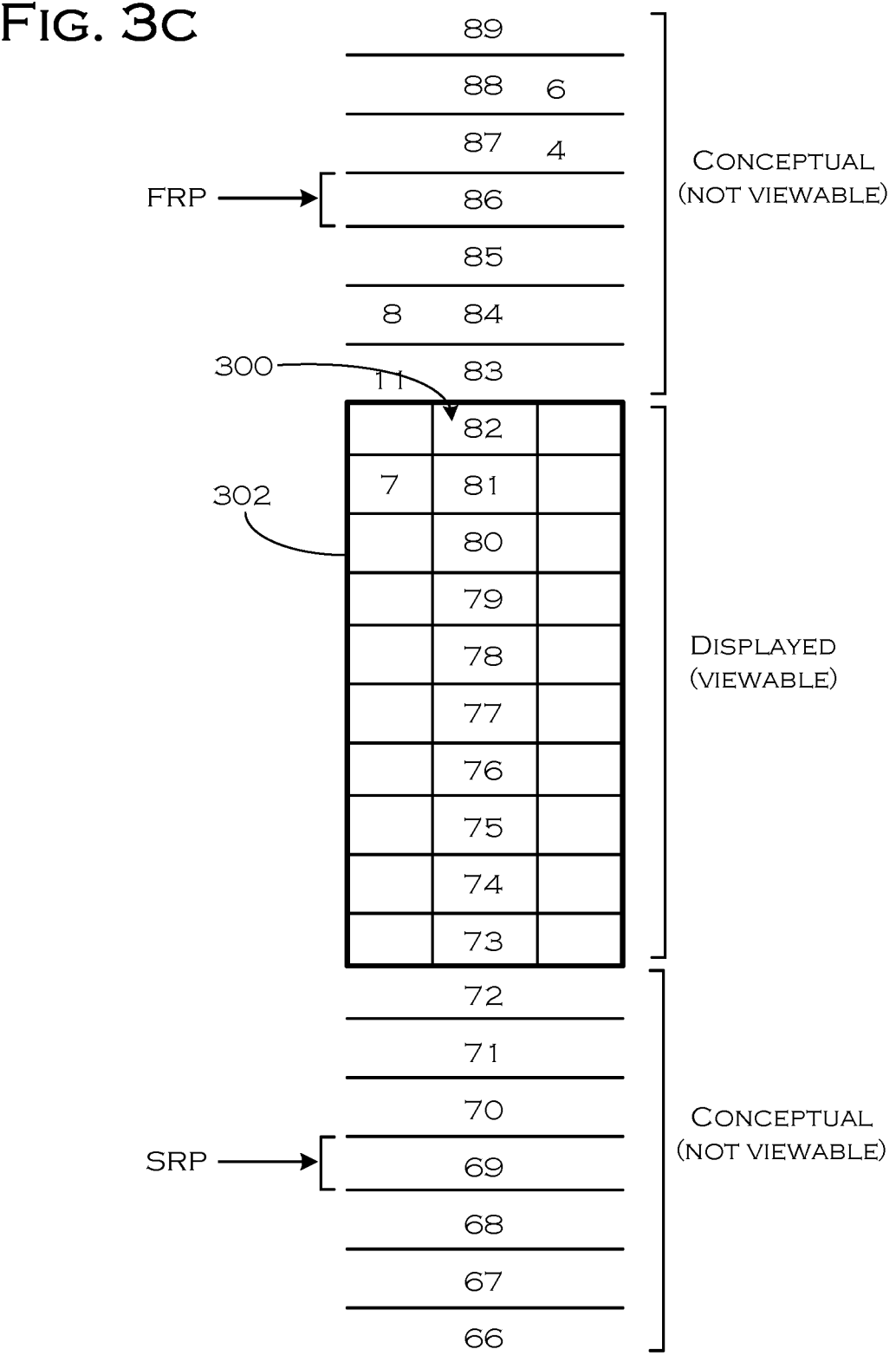

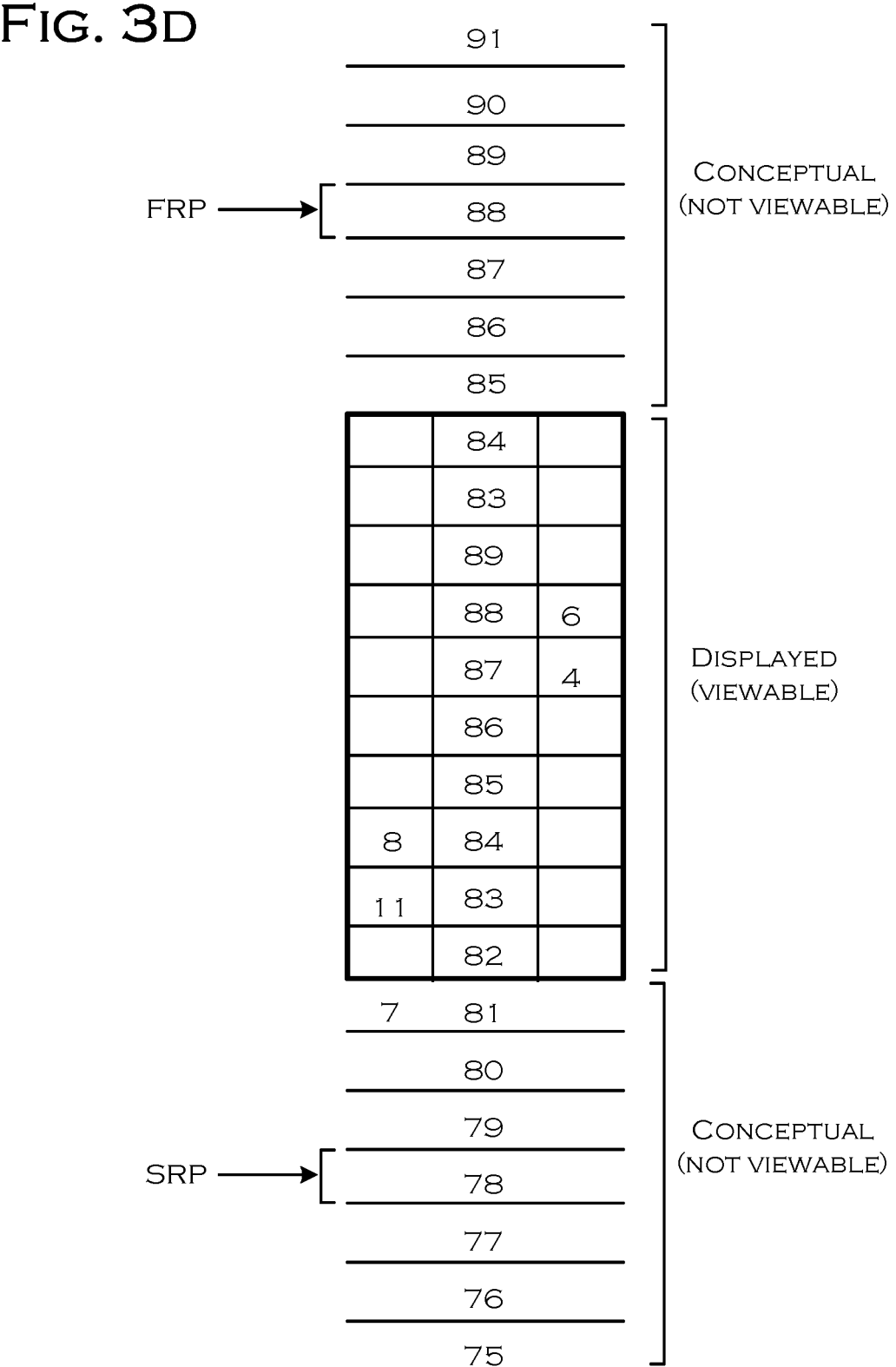

REPOSITIONING A VALUE AXIS

CROSS-REFERENCE TO RELATED APPLICATIONS

This application is a continuation of U.S. patent application Ser. No. 15/803,475, filed Nov. 3, 2017, now U.S. Pat. No. 10,068,293, which is a continuation of U.S. patent application Ser. No. 12/913,353, filed Oct. 27, 2010, now U.S. Pat. No. 9,858,620, the contents of each of which are fully incorporated herein by reference for all purposes.

BACKGROUND

This patent document relates to electronic trading. In particular, this document describes tools and features for use in electronic trading.

An electronic trading system generally includes a number of client devices in communication with one (or more) electronic exchanges. By way of illustration, an electronic exchange receives a trade order from a client device. Upon receiving the trade order, the electronic exchange enters the trade order into an exchange order book and attempts to match quantity of the trade order with quantity of one or more contra-side orders. A sell order is contra-side to a buy order of the same price. Similarly, a buy order is contra-side to a sell order of the same price. Unmatched quantity of a trade order is held in the exchange order book until it is matched by the electronic exchange. Unmatched quantity of a trade order may also be removed from the exchange order book when a trade order is cancelled, either by the client device or the electronic exchange, for example. Upon matching quantity of the trade order, the electronic exchange typically sends a confirmation to the client device that the quantity of the trade order was matched. It is understood that an electronic exchange may operate differently depending on a number of factors, which might include the type of exchange, product traded, regulatory control, and so on.

In addition to matching trade orders, an electronic exchange typically transmits market data to the client devices. Market data may include, for example, price data, market depth data, last trade quantity data, trade order data, order fill data, and so on. For example, the electronic exchange might send a price data feed to the client devices to provide a current inside market (e.g., a highest bid price and a lowest ask price). In another example, the electronic exchange might send a market depth data feed to the client devices to provide the quantities available to be bought or sold at various price levels. Of course, the electronic exchange might send the data to the client devices together using one or more feeds.

In some situations, a client device receives and processes market data without displaying the market data on a display device. These kinds of client devices are typically server-side devices, black boxes, and other programmed trading devices that do not necessarily require a user to view the data. However, in other situations, the client device displays the market data, or at least a portion thereof, on a display device. Accordingly, the client device may include software that creates a trading screen. Generally, a trading screen enables a user to participate in electronic trading. For example, a trading screen may enable a user to view market data, submit a trade order, obtain a market quote, monitor a position, or any combination thereof. Example trading tools that provide this kind of functionality include X_TRADER® and MD Trader®, which are commercially offered by Trading Technologies International, Inc., located at 222 South Riverside Plaza, Chicago, Ill., 60606.

Electronic trading has made it possible for an increasing number of participants to be active in a market at any given time. The increase in the number of market participants has advantageously led to, among other things, a more competitive market and oftentimes greater liquidity. In a competitive environment, like electronic trading, where every second or a fraction of second counts in intercepting trading opportunities, it is desirable to offer tools or features that help a participant effectively compete in the marketplace or even give an edge over others.

BRIEF DESCRIPTION OF THE DRAWINGS

Example embodiments are described herein with reference to the following drawings.

FIGS. 3A, 3B, 3C, and 3D show a value axis to illustrate repositioning according to an embodiment.

Figure 1:
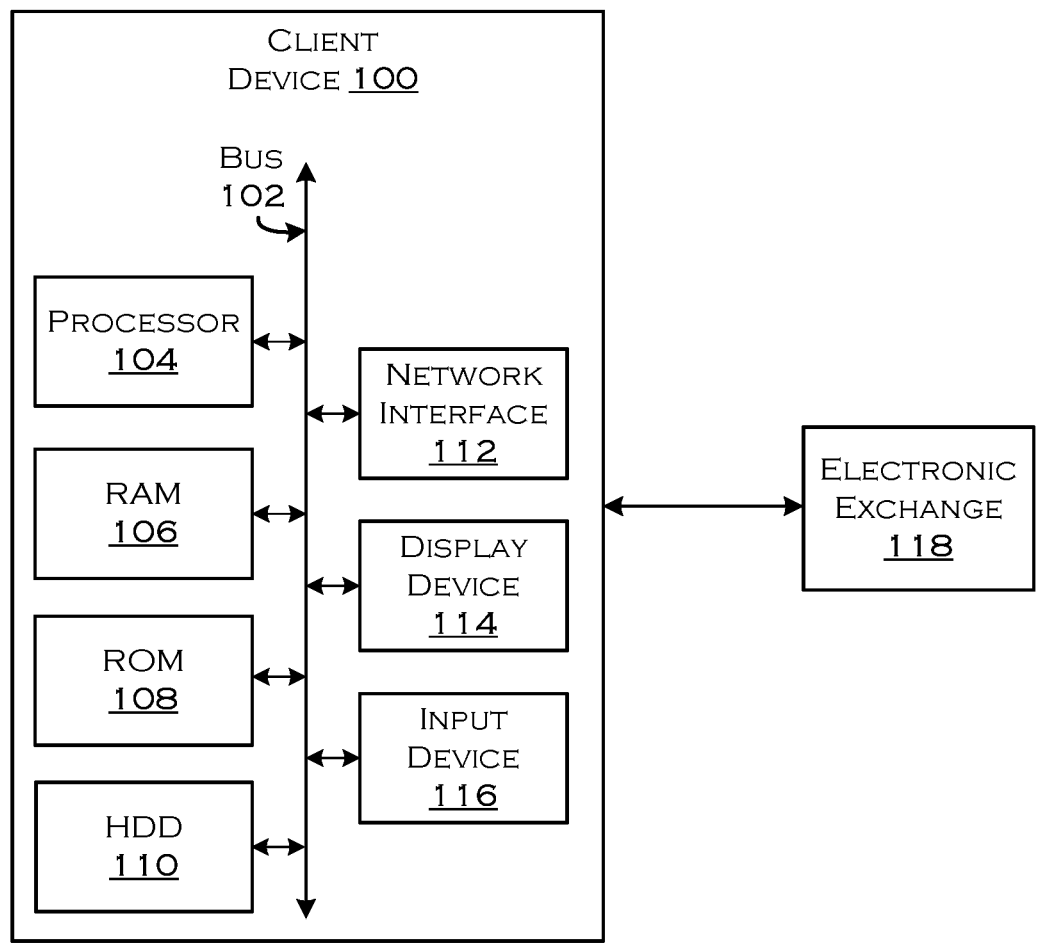
FIG. 1 is a block diagram illustrating components of a client device, which is used as a trading apparatus that implements a graphical user interface according to an embodiment.

The following detailed description will be better understood when read in conjunction with the drawings which show certain example embodiments. The drawings are for the purpose of illustrating certain embodiments, but it is understood that the inventions are not limited to the arrangements and instrumentality shown in the drawings.

DETAILED DESCRIPTION

I. Overview

Various embodiments of a trading screen described herein make use of certain benefits associated with automatically repositioning a value axis, and yet increase the user confidence in such a screen by intelligently reducing, or sometimes eliminating, the frequency of repositioning. Benefits of automatic repositioning might include, among other things, bringing the market or some aspect thereof back into view, relieving the user from having to manually reposition the value axis, and reducing the consumption of screen real estate by allowing a smaller value axis to be displayed. Reducing the frequency of repositioning may, among other things, decrease the cognitive load on the user and decrease the number of times the price of an order entry cell changes as compared to a conventional trading screen. For instance, when selecting the order entry cell, oftentimes with a single click or double click of a user input device, the user may be more confident, in comparison to a conventional trading screen, that a trade order will be placed at the price of the cell during the time of selection.

The embodiments offer an intuitive view of the market by allowing one or more market indicators to traverse a value axis in a way that directly reflects whether the market has gone up or down in value. Given this operational behavior, one or more market indicators may undesirably go out of view. That is, as the market indicator moves up or down in value beyond the boundaries of the viewable area, the indicator may move off-screen. One way to address this is by allowing the user to manually reposition the price axis, which in turn shifts the market indicator back in view upon receipt of a command from a user input device to reposition the price axis. See, for example, U.S. Pat. Nos. 6,772,132 and 7,761,362. Another way to address this is by allowing the computer to automatically reposition the price axis to maintain trading activity in view. See, for example, U.S. Pat. Nos. 7,685,055 and 7,587,357.

The embodiments build upon similarly operative trading screens (examples of which are described more below), but provide further advantages. According to an example embodiment, value levels of a value axis are provided in a viewable area of a graphical interface. A market value indicator for a tradeable object is provided in the viewable area and in alignment with a corresponding value level along the value axis. The market value indicator may ascend or descend the value axis as the underlying value of the market value indicator changes. There may be extended periods of time when the market value indicator stays within view due to small market fluctuations or by having a large number of value levels in the viewable area. Nonetheless, if new data is received and it is determined that the underlying value is greater than (or equal to) a first reposition point (FRP), where the FRP is at least two value levels higher than the highest viewable value, then the value axis is repositioned. If new data is received and it is determined that the underlying value is less than (or equal to) a second reposition point (SRP), where the SRP is at least two value levels lower than the lowest viewable value, then the value axis is repositioned. Unlike a conventional trading screen, various embodiments described herein intentionally allow the market value indicator to go out of view and still not cause a repositioning of the value axis, because the reposition point is greater than (or less than) at least two levels higher (or lower) than the highest (or lowest) viewable value on the screen, more of which is described below.

Various embodiments described herein may further increase the user's confidence in use of the trading screen by advantageously providing automatic reposition functionality, but intelligently reducing the frequency of automatic repositioning. To do so, the embodiments may allow the market value indicator to go out of view without necessarily triggering a reposition command. When a defined type of market movement occurs however, such as a large market jump or the market has moved far off screen, the value axis is automatically repositioned to bring the market value indicator back in view. As such, the user may gain more confidence in using the trading display, particularly with respect to an order entry screen and especially when only a small number of price levels are provided in the viewable area, because there is less risk of the value changing on the display during order entry. These advantages and others will be evident to a person of ordinary skill in the art by the following description.

Reference herein to "one embodiment," "an embodiment," or "an example embodiment" means that a particular feature, structure, or characteristic described in connection with the embodiment can be included in at least one embodiment of the invention. The appearances of the these phrases in various places in the specification are not necessarily all referring to the same embodiment, nor are separate or alternative embodiments mutually exclusive of other embodiments.

II. Example Apparatus Architecture Overview

FIG. 1 is a block diagram illustrating components of a client device 100, which is used as a trading apparatus that implements a graphical interface according to an embodiment. Examples of the client device 100 include a personal computer, workstation, server computer, or some other computer. The client device 100 includes a processor 104, which provides overall control. The processor 104 is connected via a bus 102 to a RAM (Random Access Memory) 106, a ROM (Read Only Memory) 108, a HDD (hard disk drive) 110, a network interface 112, a display 114, and an input device 116. Oftentimes, the input device 116 includes a keyboard, mouse, or both. The client device 100 is configured to be in communication with electronic exchange 118 via network interface 112. Other devices, such as a gateway or router, may be used to facilitate the communication between the client device 100 and the electronic exchange 118.

The HDD 110 stores a base program (e.g., operating system) and various application programs. When the client device 100 starts up, the processor 104 reads the base program from the HDD 110 and executes the base program in the RAM 106. Further, the processor 104 reads an appropriate application from the HDD 110 in accordance with user operation, which is input from the input device 116, executes the application in the RAM 106, and displays the processing results on the display 114.

An application, such as a program that when executed by an apparatus causes the apparatus to perform a process or embodiment described herein, may be stored in the HDD 110. A copy of the application program may be placed onto the HDD 110 via a computer readable medium, or for example, by receiving the application program over a network from some other source like a remote server, which could also have a copy of the application program.

In addition, it is understood that the client device 100 may access an application program on a vendor's system through a web browser or a thin-client. As such, the vendor's system may include a computer readable medium that stores the application. By way of example, the client device 100 may access the application or software in accordance with an application service provider (ASP) model.

Embodiments described herein may include any of an apparatus, a method, a system, a computer program, and an article of manufacture embodied as a computer readable medium. By way of illustration, the computer readable medium may include volatile and non-volatile storage media, such as random access memory, read-only memory, flash memory, magnetic tape, disk, optical media, any combination thereof, or any now know or later developed tangible data storage device. The embodiments may be resident at the client device 100 or some other computer device, such as a remote server or vender system.

III. Repositioning Market Information

Figure 2:
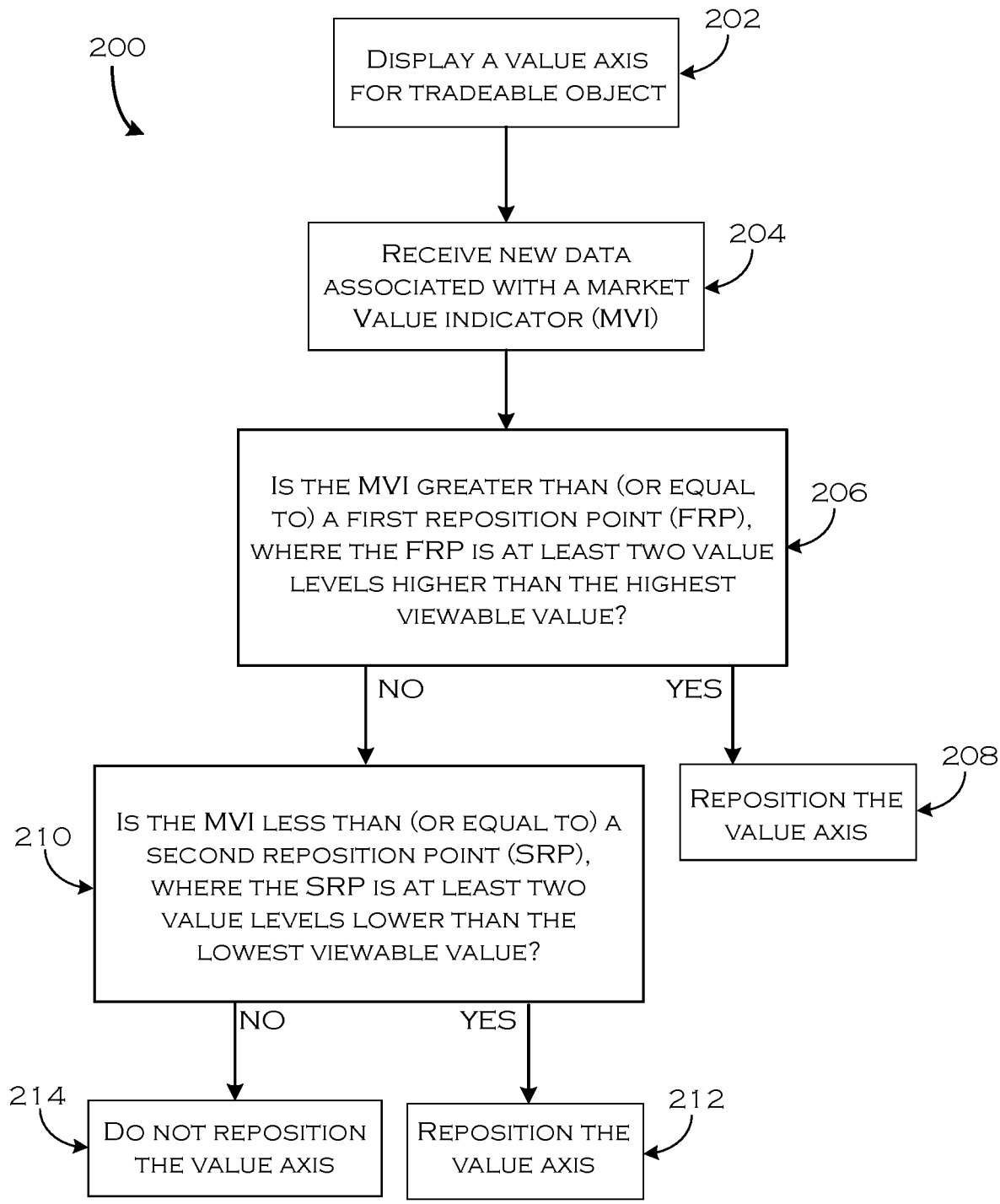
FIG. 2 is a flowchart that illustrates a process of an embodiment.

FIG. 2 is a flowchart 200 that illustrates a process that may be carried out by any of an apparatus (e.g., like the client device 100), a system, a computer program, and a computer readable medium. The process may implement an embodiment for reducing, or sometimes eliminating, the number of times a value axis is repositioned. In doing so, the process may purposefully allow for a market value indicator to fall out of the viewable area on a display and yet not reposition the value axis. When a certain market movement occurs, the process will reposition the value axis to bring the market value indicator back in view. It is understood however that the present invention is not limited to the process shown and described with respect to FIG. 2. Changes and modifications made therein may be made without departing from the spirit and scope of certain inventive aspects described herein.

Block 202 calls for displaying a value axis for a tradeable object. A tradeable object is any item, product, or object which can be traded with a quantity, price, or both. For example, financial products such as stocks, options, bonds, futures, currency, warrants, funds derivatives, securities, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

A value axis includes a series of value levels that are axis oriented. The series of value levels represent values (such as prices or derivative of prices) of the tradeable object and are oftentimes displayed in numerical order. The value levels may increment in the minimum amount that the price of the market can change (e.g., tick size), or some other set amount. The number of value levels may be fixed or adjustable. An example value axis may have 20 value levels, though more or less value levels can be used. Market data, such as a bid, offer, last traded quantity, working order, or any other item of interest associated with the market, can be displayed in alignment with the value axis. Further, orders for the tradeable object may be initiated (and sent in one embodiment) directly off the value axis. An example value axis is illustrated in FIGS. 3A-3D, more of which is described below.

It is understood that that the number of value levels that are viewable, as opposed to being out of view, may vary depending on various circumstances, such as the size of the display screen, a selection of visible value levels, or the scaling of the value axis. For example, a larger display screen (e.g., a 20 inch monitor) may display more value levels than a smaller display screen (e.g., a 15 inch monitor). In yet another example, a user may select to only have 10 value levels visible, even though 20 value levels may be displayed on the display screen.

Block 204 calls for receiving new data, from an electronic exchange, associated with a market value indicator (MVI). The MVI is an indicator based on data for a tradeable object that includes one or more price levels. Oftentimes, the market price indictor includes one or two price levels, but may include more if so programmed. Examples of an MIV include any of a last trade price (LTP) or quantity (LTQ), a best bid price, a best ask price, a combination of prices such as the best bid and ask prices, a combination of prices such as the best bid and the LTP, a combination of prices such as the best ask and the LTP, a formula driven value such as an inside market average or an average of other price indicators or a moving average or a theoretical value.

Referring back to FIG. 1, for example, the MVI may be set by a user via input device 116 or hard-coded as part of the application program stored in the HDD 110. If the former, then the display device 114 may display a configuration window output on display device 114 that provides one or more options to set the MVI. The configuration window may also provide a formula field. The input via input device 116 may be placed in the RAM 106 and used by processor 104 to carry out the instructions. Irrespective of how the MVI is chosen or set, assume for example that the MVI is set to the LTP. Then, new LTP data associated with the MVI is received at the network interface 112 and placed, for example, in the RAM 106. New LTP data can overwrite old LTP data.

In one embodiment, the MVI may be displayed in the viewable area along with the value axis. For example, the MVI might include an actual element displayed along the value axis, such as a shape or text or number. The MVI might include a highlighted value along the value axis. By way of illustration, the MVI might include a best bid quantity, best ask quantity, last trade quantity. The MVI might fall directly on a value level or it could fall between two value levels (e.g., when the MVI is an average value). In another embodiment, the MVI is not displayed at all (e.g., an average value might not get displayed).

Block 206 calls for determining whether the MVI is greater than (or equal to) a first reposition point (FRP), where the FRP is at least two value levels higher than the highest viewable value. The FRP is a value level that is out of view and therefore not provided in the viewable area along the value axis. The FRP is at least two values higher than the highest viewable value, but more often the FRP is set to a value much higher than two levels. The higher the FRP, the less often the value axis will reposition. It is possible therefore that the FRP is set to 100 price levels higher than the highest viewable value, for example. In such a case, the value axis would rarely reposition unless the MVI experiences a large jump or it moves far off screen (though in this instance, it is likely that the user will manually reposition the value axis to bring it back into view at some point). In an embodiment, regardless of the FRP, it is possible to manually reposition the value axis.

The FRP may be derived using a fixed value, such as a starting point in relation to the value axis plus 10, 15, 28, 45, 75, or 100 value levels, for example. A starting point might be set to the middle of the value axis, the top or bottom of the value axis, or some other point in the viewable (or non-viewable) area. The starting point could be input via input device 116 and placed in the RAM 106, or alternatively, the starting point could be hard-coded as part of the application program stored in the HDD 110, for example.

The FRP might instead be a formula driven value, such as a market price plus an offset value. For instance, the FRP may be determined from the MVI. For instance, assume that the MVI is the best ask price, then an FRP that is 20 value levels from the last best ask price is determined from the MVI. Such a setting would require that a new best ask price jump upward 21 value levels from the previous best ask price before the value axis is repositioned. The FRP in such an embodiment changes as the best ask price changes.

Irrespective of how the FRP is derived, the FRP is to be at least two value levels higher than the highest viewable value. That is, the FRP must be set to a point that results in a possibility of the MVI going out of view and yet not cause an automatic reposition to take place (e.g., at a point in time during the trading session, the MVI could be at one value level higher than the highest viewable value and therefore be out of view).

Block 208 calls for repositioning the value axis when the MVI is greater than the FRP. In certain embodiments, the value axis may be repositioned when the MVI is equal to or greater than the FRP. In certain embodiments, the repositioning causes the MVI to be placed back into view. In certain embodiments, the repositioning causes a market price like best bid, best ask, and/or last trade price to be placed back into view. In some embodiments, however, the MVI or market price, for example, may be repositioned and placed out of view but still closer to being in view.

Block 210 calls for determining whether the MVI is less than (or equal to) the second reposition point (SRP), where the SRP is at least two value levels lower than the lowest viewable value. The SRP may be similarly determined as the FRP—as such, the designation of "first" and "second" in the description does not necessarily imply a difference except that the SRP is a point below the value axis, whereas the FRP is a point above the value axis. Techniques for determining the SRP may be similar to those used to compute the FRP. In some embodiments, however, the SRP may be computed differently from the FRP. This execution of logic by processor 104, for example, of block 210 may come before, together with, or after (as shown in 200) the execution of logic by processor 104 of block 206.

Block 212 calls for repositioning the value axis when the MVI is less than the SRP. In certain embodiments, the value axis may be repositioned when the MVI is equal to or less than the SRP. In certain embodiments, the repositioning causes the MVI to be placed back into view. In certain embodiments, the repositioning causes a market price like best bid, best ask, and/or last trade price to be placed back into view. In some embodiments, however, the MVI or market price, for example, may be repositioned and placed out of view but still closer to being in view.

Block 214 calls for the value axis to not be repositioned. Unlike conventional systems, the process 200 allows for a market value indicator to fall out of the viewable area on a display and yet not reposition the value axis. A manual reposition command however may be input via the input device 116 at any time, if for example the software application stored at the HDD 110 is so programmed.

It is understood that instead of comparing the MVI to the FRP or SRP, as performed in blocks 206 and 210, the program may instead compare the MVI to a range of value levels determined from the FRP or SRP, more of which is described below.

IV. Repositioning Example

FIG. 3A shows a value axis 300 with example prices to illustrate repositioning according to an embodiment described herein. The value axis 300 may be part of a trading screen and is displayed within a viewable area 302. The viewable area 302 is what is displayed to a user, for example, via display device 114 in FIG. 1. Value levels shown outside of viewable area 302 are for purposes of illustration and generally are not viewable to the user.

Value axis 300 currently shows example prices 73 to 82. Locations within the viewable area 302 and adjacent to the prices provide areas to display corresponding market information like bids and offers. For instance, a best bid price is 77 because the highest bid quantity is 10 and is displayed adjacent to a price of 77. Another bid is shown 14 at 75. A best ask price is 78 because the lowest offer is 12 and is displayed adjacent to a price of 78. Another offer is shown 9 at 79. More or less locations may be shown, and might provide the LTP and LTQ or some other configured item of interest, as it relates to the value axis 300.

In addition, selecting any of the locations may send trade orders to the exchange for a default quantity at a price that corresponds to the selected price level. In other words, viewable area 302 provides a number of locations to send trade orders on to the electronic exchange, where for example those locations displayed to the left of the value axis pertain to orders to buy and those locations displayed to the right of the value axis pertain to orders to sell. For instance, a user might select location 304 with a single action of a user input device (e.g., a single click of a mouse, double click of a mouse, cursor hover, tap on the screen, modal shift and key press, and other similarly known single actions) to send a trade order to the exchange to buy a default quantity at a price of 76. In another instance, the user might select location 306 with a single action of a user input device to send a trade order to the exchange to sell a default quantity at the price of 77. Other configurations are possible and therefore it is understood that the present embodiments are not limited to that shown in the figure.

As described briefly above, FIG. 3A also shows a conceptual extension of the value axis 300 to illustrate an embodiment. The first extension includes prices 83 to at least 89 and the second extension includes prices 72 down to at least 66. These values would ordinarily not be displayed to the user, but are displayed here to show a conceptual operation of the embodiment.

Assume for the moment that the inside market prices (the best bid and ask prices) are set as the MVI, such that a reposition is triggered when any of the best bid and ask prices is equal to either the FRP or SRP. Currently, the best bid is 77 and the best ask is 78. Assume also that the FRP is at 86 and the SRP is at 69. The SRP is not as important here because this example will look to a market increase.

FIG. 3B shows the viewable area 302, only some time after that shown in FIG. 3A and the market has moved up in value. In fact, the market has moved so far that the best bid, now at 84, and best ask, now at 85, are currently out of view. The value axis is not repositioned, unless of course, the user signals a manual reposition command, if such an option is available to the user.

Using a conventional trading screen with the automatic repositioning feature turned ON, if the user wanted to send a trade order to buy at 76 (as evident by the cursor placed over an order entry cell in alignment with 76 in FIG. 3A), but the market changed such that the MVI is no longer in view, then the software would have automatically repositioned the value axis to keep the MVI in view. During this time, it is possible for the user to actually select a different price (a price greater than 76) because the screen could update just before the user actually selected the location. This can lead to disastrous consequences especially if the screen update caused the user to cross the market and buy the tradeable object for more than originally intended.

Using a trading screen that employs the embodiments described herein, however, the value axis 300 is not necessarily repositioned to keep the MVI in view. In fact, the value axis shown in FIG. 3B is not repositioned, and therefore the user would have placed a trade order at the desired price of 76. The reduction in frequency of repositioning, as compared to conventional trading screens, can lead to higher confidence in placing trade orders.

FIG. 3C shows the viewable area 302, only some time after that shown in FIG. 3B and the market has moved further up in value. Here, the best ask price moved beyond the FRP. As such, the value axis 300 will be repositioned by the computer to that shown in FIG. 3D, for example, where the best ask price is moved to the middle of the viewable area 302. Note that the best ask price could have been moved to a different location than the middle of the viewable area 302. Also, the value axis 300 could have repositioned so that the inside market is placed in the middle of the viewable area 302, to the extent that it can be.

Referring back to FIG. 3B, another way to look at the example embodiment is that the inside market (the MVI in this example) was intentionally allowed to go out of view, because it did not satisfy a threshold condition (the FRP in this example). That is, the inside market fell within a first range of prices 83-85 along the value axis 300, where the first range of price levels is substantially contiguous to a price level in the viewable area (price 82) and outside of the viewable area 302. As a result, the value axis 300 is not repositioned. When the inside market fell within a second range of prices 86 and higher along the value axis 300 per FIG. 3C, where the second range of prices is substantially contiguous to the first range of price levels and outside of the viewable area 302, then the value axis 300 is repositioned per FIG. 3D. The first and second range of prices may be determined using the FRP.

A similar process applies to the SRP, but instead the market would need to go down in value and therefore fall outside of viewable area 302. Then, the MVI is compared to the SRP to determine whether to reposition the value axis 300. That is, if the MVI is less than or equal to the SRP, then the value axis 300 is repositioned, otherwise it is not repositioned.

V. Conclusion

The embodiments described herein may be utilized by any type of trading screen that may put to use the embodiments provided herein. For example, a non-moving value axis or a drifting value axis may all benefit from use of the embodiments described herein. Additional types of automatic repositioning tools and manual repositioning tools may be used along with the present embodiments, and may each provide their own distinct advantages to the overall system.

While a number of inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

What is claimed is:

1. A method comprising:
    displaying, via an electronic display of a computing device, a graphical user interface having viewable area within the electronic display, where a market value indicator is displayed along a plurality of price levels along a price axis according to a value of the market value indicator, and where the market value indicator ascends or descends the price axis as the value of the market value indicator changes, the value of the market value indicator being determined according to market data received at the computing device; and
    determining, via an electronic processor of the computing device, whether the value of the market value indicator based on the market data is beyond a first repositioning point beyond the viewable area and whether the market value indicator is not within the viewable area,
       where in response to determining that the value of the market value indicator is not beyond the first repositioning point beyond the viewable area and that the market value indicator is not viewable within the viewable area, the electronic processor causes the display to maintain the plurality of price levels along the price axis within the viewable area without repositioning the price axis, and
       where in response to determining that the value of the market value indicator is beyond the first repositioning point beyond the viewable area and that the market value indicator is not viewable within the viewable area, the electronic processor causes the display to reposition the price axis to bring the market value indicator back into the viewable area.

2. The method of claim 1, wherein the market value indicator corresponds to any of a best bid price, best ask price, and last traded price.

3. The method of claim 1, where the electronic processor causes the display to display the market value indicator when the value is within the viewable area.

4. The method of claim 1, further comprising receiving, via a user input device, a command to manually reposition the price axis, wherein the market value indicator is brought back into the viewable area responsive to the command.

5. The method of claim 1, wherein the first repositioning point is greater than a highest viewable price level.

6. The method of claim 5, further comprising receiving, via a user input device, an input from a user to determine the first repositioning point.

7. The method of claim 1, wherein first repositioning point is less than a lowest viewable price level.

8. The method of claim 7, further comprising receiving, via a user input device, an input from a user to determine the first repositioning point.

9. The method of claim 1, further comprising receiving, via a user input device, an input from a user to determine the market value indicator.

* * * * *